United States Patent [19]

Hartman

[11] Patent Number: 4,458,298

[45] Date of Patent: Jul. 3, 1984

[54] PHOTOFLASH ARRAY INTERFACE TAB

[75] Inventor: Donald W. Hartman, Williamsport, Pa.

[73] Assignee: GTE Products Corporation, Stamford, Conn.

[21] Appl. No.: 438,689

[22] Filed: Nov. 3, 1982

[51] Int. Cl.³ .............................................. G03B 15/02
[52] U.S. Cl. ......................................... 362/15; 362/13; 362/226; 362/240; 362/241; 362/251; 362/295; 362/297; 362/307; 362/346; 362/375; 431/357
[58] Field of Search .................... 431/357; 362/15, 13, 362/226, 240, 241, 251, 295, 297, 307, 346, 375

[56] References Cited

U.S. PATENT DOCUMENTS 4,424,020 1/1984 Bouchard et al. .................... 362/11

Primary Examiner—Stephen J. Lechert, Jr.
Attorney, Agent, or Firm—Thomas H. Buffton

[57] ABSTRACT

A miniaturized multilamp photoflash includes a reflector member disposed within a plastic cover and having a plurality of cavities each containing a flashlamp and a pair of spaced leg members formed for engagement within a camera. A planar support platform is affixed to the reflector member and has a printed circuit on a surface adjacent the reflector member and a tab portion wider than the spaced leg members whereby insertion of the tab portion into a receiving socket is controlled by the width of the tab portion.

9 Claims, 5 Drawing Figures

PHOTOFLASH ARRAY INTERFACE TAB

TECHNICAL FIELD

This invention relates to miniaturized multilamp photoflash arrays and more particularly to the interface of a photoflash array and a receiver such as a camera.

BACKGROUND ART

Generally, exposure of a plurality of frames of photographic film requiring artificial light was effected by individual lamps wherein a single lamp was expended for each frame of film. Upon exposure, the lamp was physically replaced and the operation repeated. Moreover, a flashlamp holder having an arrangement for lamp replacement was attached and responsive to operation of the camera.

Following, the well-known flash-cube system arrived wherein a cube-like member having four flashlamps therein was affixed and responsive to camera activation to provide an unused flashlamp for each of four frames of film. Moreover, apparatus was provided whereby the flashlamp was activated either electrically or mechanically but always in synchronization with camera operation.

Another presently available multilamp photoflash array is known as the "flip-flash" array. Therein, a printed circuit is affixed to a circuit board having an outwardly extending tab member. A plastic housing member has a pair of leg members which partially enclose and protect the tab member and serve to secure the array within the receiving socket of a camera. For example, a camera receiving socket is described in U.S. Pat. No. 3,941,447.

Although the above-mentioned "flip-flash" arrays have been and still are very popular and numerous available cameras employ such arrays, it has been found that technological advances have provided other choices. More specifically, advances in film speed have permitted a reduction in the amount of artificial light required to properly expose the improved film. As a result, a problem is presented in that it is desirable to provide a miniaturized low light output array for use in a new camera which will also accept a higher output array such as the "flip-flash" array. Thus, an array is required which will not be accepted in cameras employing a flip-flash array but will be utilized in a new camera which will also accept a flip-flash array.

OBJECTS AND SUMMARY OF THE INVENTION

An object of the present invention is to provide an improved miniaturized photoflash array. Another object of the invention is to provide an enhanced miniaturized multilamp photoflash array unacceptable by existing cameras having receiving sockets for engagement with "flip-flash" arrays. Still another object of the invention is to provide a miniaturized photoflash array which will interface with cameras which will also accept "flip-flash" arrays.

These and other objects, advantages and capabilities are achieved in one aspect of the invention by a miniaturized multilamp photoflash array having a plastic cover member wherein is positioned a reflector member with a plurality of cavities, each containing a flashlamp and a pair of spaced outwardly extending leg members formed for engagement with a receiving socket. A planar support platform is affixed to the reflector member and includes a printed circuit contacting the flashlamps and a tab portion of a width greater than the width of the spaced leg members with a circuit means thereon connecting a potential source to the printed circuit.

BEST MODE FOR CARRYING OUT THE INVENTION

For a better understanding of the present invention, together with other and further objects, advantages and capabilities thereof, reference is made to the following disclosure and appended claims in conjunction with the accompanying drawings.

Figure 1:
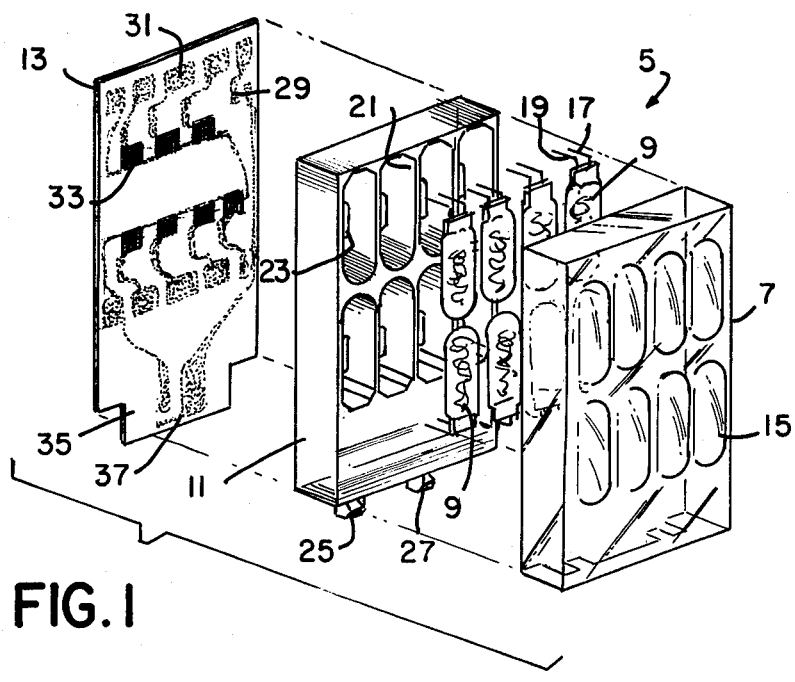
FIG. 1 is an exploded perspective view of a multilamp photoflash array of the invention illustrating the engageable projecting tab.
Figure 2:
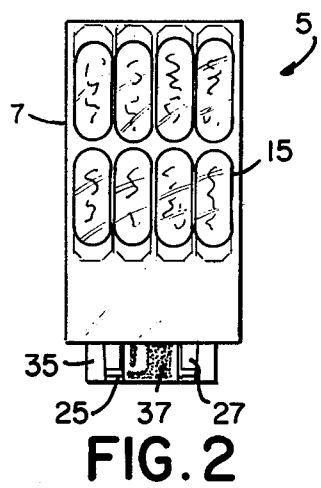
FIG. 2 is a plan view of the photoflash array of FIG. 1.

Referring to FIGS. 1 and 2 of the drawings, a miniaturized multilamp photoflash array 5 includes a plastic cover member 7, a plurality of flashlamps 9, a reflector member 11 and a planar support platform 13. The plastic cover member 7 is a substantially box-like configuration and includes a plurality of outwardly extending bulbous portions 15. Each of the bulbous portion 15, in the embodiment, is formed for alignment with one of the flashlamps 9. Also, each of the flashlamps 9 includes the usual electrical leads or conductors 17 and 19.

Figure 5:
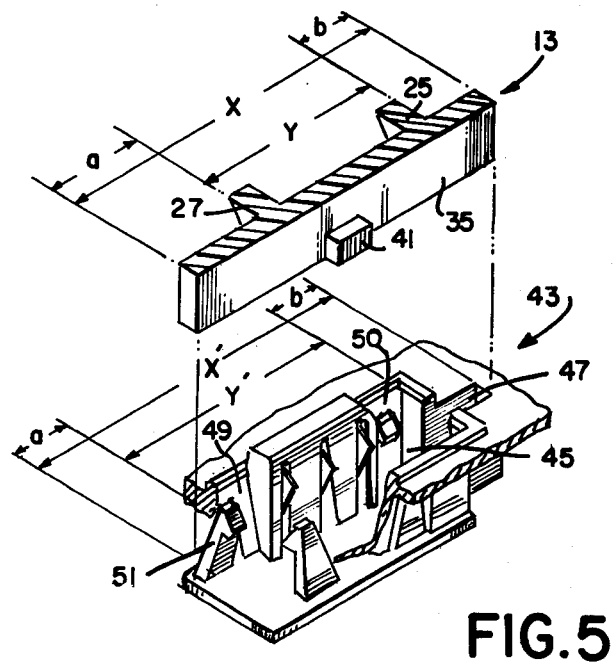
FIG. 5 is a top cross-sectional view, partially cutaway, illustrating the array receiving socket configuration of a camera formed to receive the array of FIG. 1.

The reflector member 11 is a plastic configuration having a plurality of spaced flashlamp-receiving cavities 21 and each of the cavities 21 includes an open-back portion 23 wherein radiation available from a flashlamp 9 is transmitted as will be explained hereinafter. Also, the reflector member 11 includes a slot and one or more apertures (not shown) whereby passage is provided for the electrical conductors 17 and 19 of a flashlamp 9 positioned therein. A pair of spaced outwardly extending leg members 25 and 27 of the reflector member 11 are formed for engagement with a receiving socket of a camera (FIG. 5). Moreover, the reflector member 11 is formed to fit into the cover member 7 with the leg members 25 and 27 external to the cover member 7 and available for insertion into and engagement with a receiving socket of a camera.

A planar support platform 13 has a printed ciruit 29 on one surface thereof. The support platform 13 serves as a closure member for the array 5 and the printed circuit 29 on the one surface thereof includes a plurality of electrically conductive portions 31 positioned for contact with the electrical conductors 17 and 19 of the flashlamps 9. Also, a plurality of radiation-responsive switches 33 are located such that radiation from an activated flashlamp 9 passes through the open-back portion 23 of the reflector member 11 and converts a switch 33 from one conductive state to another. In other words a normally closed (N/C) switch is rendered non-conductive or a normally open (N/O) switch is rendered conductive.

Figure 3:
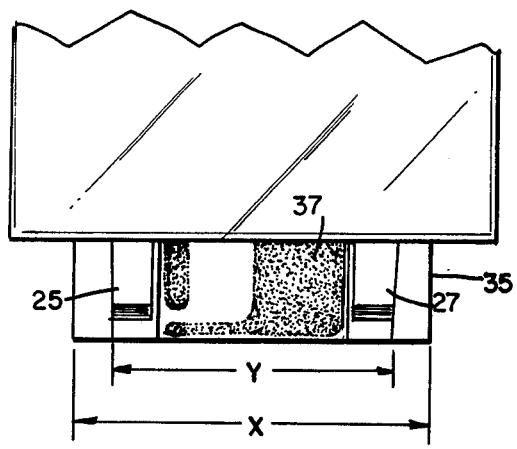
FIG. 3 is a front view illustrating the tab portion of one embodiment of the invention.

Also, the planar support platform 13 includes an outwardly extending tab portion 35 of FIG. 3. This tab portion 35 is of a width "x" which is greater than the width "y" of the spaced leg members 25 and 27 of the reflector member 11. The surface of the tab portion 35 had a circuit means 37 thereon which is electrically connected to the printed circuit 29 of the support platform 13. This circuit means 37 is positioned intermediate the leg members 25 and 27 and formed to provide electrical connection to a pulse potential source within a receiving socket of a camera. Moreover, the planar support platform 13 is affixed to the reflector member 11 and provides an enclosure for the operational portions of the array 5.

Figure 4:
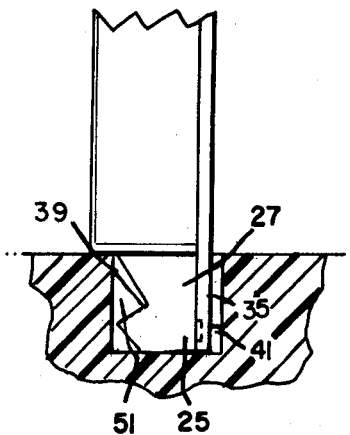
FIG. 4 is a side view illustrating the socket engagement means and a means insuring proper socket insertion.

As can more readily be seen in the front and side views of FIGS. 3 and 4, the tab portion 35 has a width dimension "X" which is greater than the width "Y" of the spaced leg members 25 and 27. Also, a circuit means 37 of the tab portion 35 is positioned intermediate the leg members 25 and 27 and at a location for electrical connection to a potential source of a camera. Also, the leg members 25 and 27 are notched 39 to provide for securement of the array 5 within a receiver socket such as a camera. Moreover, a protuberance 41 may be, not necessarily need be, affixed to the opposite surface of the planar support platform 13 in order to inhibit improper insertion of the tab portion 35 of the array 5 into a receiver socket of a camera.

Additionally, FIG. 5 illustrates, in cross-section, the tab portion 35 and affixed spaced leg members 25 and 27 of the reflector member 11. Also included is an appropriate camera socket 43 formed to receive the above-mentioned tab portion 35 and spaced leg members 25 and 27. Moreover, the camera socket 43 is also conformed to receive a so-called "flip-flash" array should the use thereof be desired. However, the present array which includes the tab portion 35 is unuseable in available cameras employing "flip-flash" arrays as will be explained.

Referring to the tab portion 35, it can be seen that there is provided a structure having a width dimension "X" which is wider than the width dimension "Y" of the spaced leg members 25 and 27 by dimensional increment "a" and "b". Moreover, a protuberence 41 is affixed to the side of the tab portion opposite to the side having the leg members 25 and 27 affixed thereafter.

The camera socket 43 includes a first slot 45 having a width dimension "Y¹" which is approximately equal to the width "Y" of the spaced leg members 25 and 27. Thus, an ordinary "flip-flash" array may be inserted into the first slot 45 and utilized with the present camera arrangement. However, the camera socket 43 also includes a second slot 47 having a width dimension "X¹" which is substantially equal to the width "X" of the tab portion 35. Thus, the presented array 5 having the tab portion 35 is not useable in previously available cameras which do not include the second slot 47. In this manner a camera and photoflash array interface is effected whereby the camera will accept available "flip-flash" arrays as well as the presented array having a wide tab portion 35. On the other hand, available cameras made to accept the available "flip-flash" array will not accept the present array having a wide tab portion 35 since there is no second slot 47 formed therein. Moreover, the camera socket 43 includes off-sets 49 and 50 formed to receive the spaced leg members 25 and 27 affixed to the tab portion 35 and on off-set (not shown) for receiving the protuberence 41 whereby proper orientation of the photoflash array 5 is effected.

While there has been shown and described what is at present considered the preferred embodiments of the invention, it will be obvious to those skilled in the art that various changes and modifications may be made therein without departing from the invention as defined by the appended claims.

I claim:
1. A miniaturized multilamp photoflash array comprising: a light transmittable plastic cover member;
    a plastic reflector member positioned within said cover member and having a plurality of lamp-receiving cavities and a pair of spaced outwardly extending leg members formed for engagement within a receiving socket;
    a flashlamp positioned within each of said lamp-receiving cavities of said reflection member; and
    a planar support platform having a surface attached to said reflector members with a printed circuit thereon electrically connected to said flashlamps and an outwardly extending planar tab portion of a width greater than the width of said spaced outwardly extending leg members and formed for insertion into and withdrawal from a receiving socket having a pulse potential source therein, said tab portion having circuit means thereon for coupling said potential source to said printed circuit.

2. The miniaturized multilamp photoflash array of claim 1 wherein said plastic cover member includes an outwardly extending bulbous portion adjacent each of said flashlamps.

3. The miniaturized multilamp photoflash array of claim 1 wherein said circuit means of said tab portion is adjacent and intermediate said spaced outwardly extending leg members of said reflector member.

4. The miniaturized multilamp photoflash array of claim 1 wherein said outwardly extending tab portion of said planar support platform includes a circuit means on a surface adjacent said spaced leg members and an outwardly extending protuberence from a surface opposite from said surface adjacent said spaced leg members whereby reversed insertion of said array into said receiving socket is prohibited.

5. The miniaturized multilamp photoflash array of claim 1 wherein said planar support platform is affixed to said reflector member and cover member to provide a sealed envelope containing said flashlamps, reflector member and printed circuit adjacent said reflector members and contacting said flashlamps.

6. The miniaturized multilamp photoflash array of claim 1 wherein said pair of spaced outwardly extending leg members are symmetrically disposed on one side of and at a spacing less than the width of said tab portion of said planar support platform.

7. In a miniaturized multilamp photoflash array having a plastic reflector member with a plurality of lamp-receiving cavities each having a flashlamp therein and a pair of outwardly extending spaced leg members with said reflector member positioned within a light transmittable plastic cover member, a planar support platform having a surface affixed to said reflector unit with a printed circuit thereon electrically contacting said flashlamps and an outwardly extending tab portion having a circuit means thereon connected to said printed circuit, said tab portion being of a width greater than the width of said spaced leg members and immediately adjacent thereto, said leg members and tab portion formed for insertion into and withdrawal from a receiving socket.

8. In the miniaturized multilamp photoflash array of claim 7, said leg members of said reflector member being formed for engagement within said receiving socket and said tab portion of said planar support platform having a circuit means on a surface thereof electrically connected to said printed circuit and formed for electrical connection to a potential source within said receiving socket.

9. In the miniaturized multilamp photoflash array of claim 7, said tab portion extending outwardly a distance substantially equal to the outward extension of said leg members and of a width greater than the width of said spaced leg members.

* * * * *